US010731960B2

(12) United States Patent
Shen

(10) Patent No.: US 10,731,960 B2
(45) Date of Patent: Aug. 4, 2020

(54) RULER SURFACE STRUCTURE FOR CLEAR MARKS DISPLAY IN A DIM LIGHT

(71) Applicant: Chih-Hao Shen, New Taipei (TW)

(72) Inventor: Chih-Hao Shen, New Taipei (TW)

( * ) Notice: Subject to any disclaimer, the term of this patent is extended or adjusted under 35 U.S.C. 154(b) by 237 days.

(21) Appl. No.: 16/009,186

(22) Filed: Jun. 14, 2018

(65) Prior Publication Data
US 2019/0383592 A1  Dec. 19, 2019

(51) Int. Cl.
*G01B 3/1003* (2020.01)
*G01B 3/04* (2006.01)
*G01B 3/1061* (2020.01)
*G01B 3/1084* (2020.01)

(52) U.S. Cl.
CPC .............. *G01B 3/1003* (2020.01); *G01B 3/04* (2013.01); *G01B 3/1061* (2013.01); *G01B 2003/1087* (2013.01)

(58) Field of Classification Search
CPC ................ G01B 3/1003; G01B 3/1061; G01B 2003/1087
USPC .......................................................... 33/494
See application file for complete search history.

(56) References Cited

U.S. PATENT DOCUMENTS

| | | | | |
|---|---|---|---|---|
| 1,828,401 A * | 10/1931 | Farrand ................ | G01B 3/1003 33/771 |
| 2,378,544 A * | 6/1945 | Fosse ...................... | D04B 3/00 66/117 |
| 3,648,835 A * | 3/1972 | Yucel ...................... | A61L 15/42 428/156 |
| 4,779,346 A * | 10/1988 | Schafer ..................... | B43L 7/00 33/1 B |
| 6,115,932 A * | 9/2000 | Fedora .................... | A01K 97/00 33/758 |
| 6,799,379 B2 * | 10/2004 | Brady ..................... | G01B 3/004 33/1 B |
| 6,892,469 B2 * | 5/2005 | Tufts ..................... | G01B 3/1084 33/768 |
| 7,065,895 B2 * | 6/2006 | Hoopengarner ..... | G01B 3/1003 33/760 |
| 7,584,548 B2 * | 9/2009 | Nielson .................... | G01B 3/10 33/765 |
| 8,904,661 B1 * | 12/2014 | Norgard .................... | G01B 3/04 33/1 B |
| 2004/0035012 A1 * | 2/2004 | Moehnke ............. | G01B 3/1003 33/494 |
| 2007/0017111 A1 * | 1/2007 | Hoback ................ | G01B 3/1003 33/771 |
| 2008/0086902 A1 * | 4/2008 | Murray .................... | G01B 1/00 33/755 |

* cited by examiner

*Primary Examiner* — Christopher W Fulton
(74) *Attorney, Agent, or Firm* — Chun-Ming Shih

(57) ABSTRACT

A ruler surface structure for clear marks display in a dim light mainly comprises a ruler surface and a brightening layer. The ruler surface is marked with marks which are characters or lines. The brightening layer is laid on the marks to enhance the display and identification effect of the marks. By using the different light sensitivities formed by the brightening layer on the marks and the other regions of the ruler surface, including the functions of light reflection or luminescence, the marks can be clearly displayed and identified in the dim light.

18 Claims, 5 Drawing Sheets

RULER SURFACE STRUCTURE FOR CLEAR MARKS DISPLAY IN A DIM LIGHT

BACKGROUND OF THE INVENTION

1. Field of the Invention

The invention relates to the field of measuring tools, more particularly to a ruler surface structure for clear marks display in a dim light.

2. Description of the Prior Art

Tape measure is a common measuring tool, which mainly includes a banded winding ruler surface upon which the numbers or scales are set as the marks of the measuring result. In order to facilitate the users to rapidly and accurately measure, the ruler surface is usually painted with yellow baking varnish as a base and then set black or red marks on the base, by using the difference of colors to increase the identification effect of the marks.

However, due to the limitation of the workplace, it is often necessary to use the tape measure in a dim light place. With the specific limitation of the ruler surface itself, the users must make more laborious effort to identify the marks thereon and additional lighting may be necessary. This not only affects the working progress, but also causes measurement errors more likely to occur.

Therefore, the prior art still has obvious deficiencies in the design of the ruler surface which needs to be improved urgently.

SUMMARY OF THE INVENTION

The invention overcomes the deficiencies of the prior art, providing a kind of ruler surface structure for clear marks display in a dim light. The ruler surface structure mainly comprises a ruler surface upon which the characters or lines are set as the marks, and at least one brightening layer which is laid on the corresponding at least one of the marks to enhance the display and identification effect of the at least one of the marks.

The principle of the invention is that the at least one brightening layer causes the at least one of the marks and the other regions of the ruler surface having different light sensitivities, including the functions of light reflection or luminescence, so that the at least one of the marks can be clearly displayed and identified in the dim light.

In one embodiment, the contour of the at least one brightening layer is consistent with or coincident with the peripheral shape of the at least one of the marks, thereby enhancing the identification effect of the at least one of the marks.

In another embodiment, the at least one brightening layer is made from a light reflecting material, by using the light reflecting effect of the at least one brightening layer to enhance the display of the at least one of the marks.

Alternatively, the at least one brightening layer is made from a luminescent material, by using the luminescent effect of the at least one brightening layer to enhance the display of the at least one of the marks.

Further, a contour layer is arranged on the periphery of each of the at least one brightening layer, which has different light sensitivities to the each of the at least one brightening layer to enhance the display effect on the periphery of each of the at least one of the marks.

Even further, each of the at least one brightening layer is set up to a set of multiple brightening layers arranged in overlapping configuration, the multiple brightening layers have different light sensitivities, causing the at least one of the marks to form the display effect with a scintillation or a stereoscopic sense.

Furthermore, each of the at least one brightening layer is a lens shaped optical element, which can enhance the display effect of the at least one of the marks.

Moreover, there is a guide angle around each of the at least one brightening layer to enhance the display effect on the periphery of the at least one of the marks.

The main advantages of the invention are that the users can complete the measurement work quickly and precisely, so as to accelerate the work and improve the accuracy of measurement. Further, the invention has simple structure, which can quickly combine with any existing tape measure and reduce the production cost. Meanwhile, the structure of the invention is quite easy to change, and a suitable ruler tool can be selected according to the needs of different works or users.

DETAILED DESCRIPTION OF THE PREFERRED EMBODIMENTS

Figure 1:
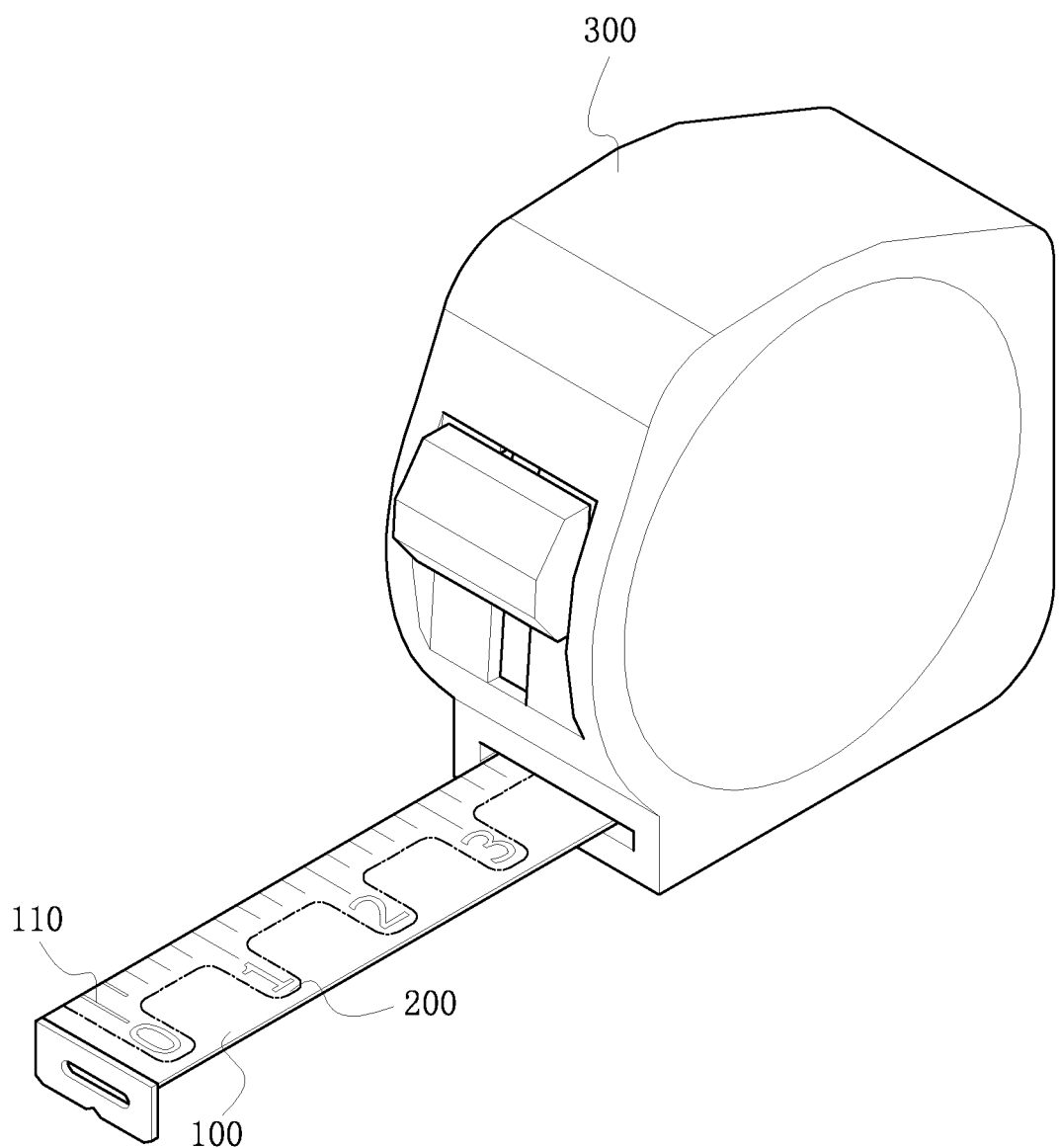
FIG. 1 is a perspective view of a ruler surface structure of the present invention fitted in a tape measure.
Figure 2:
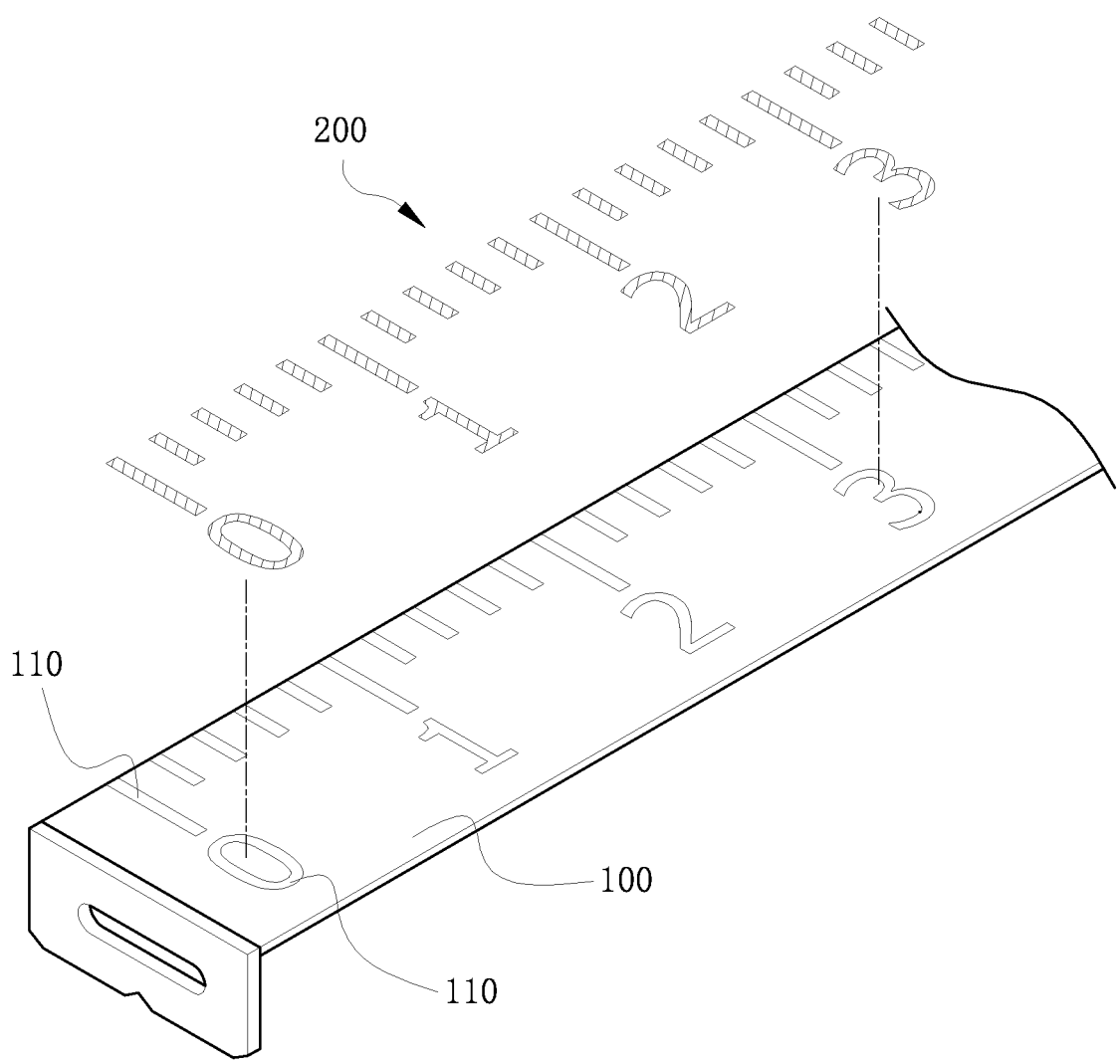
FIG. 2 is an exploded view of the ruler surface structure of the present invention.
Figure 3:
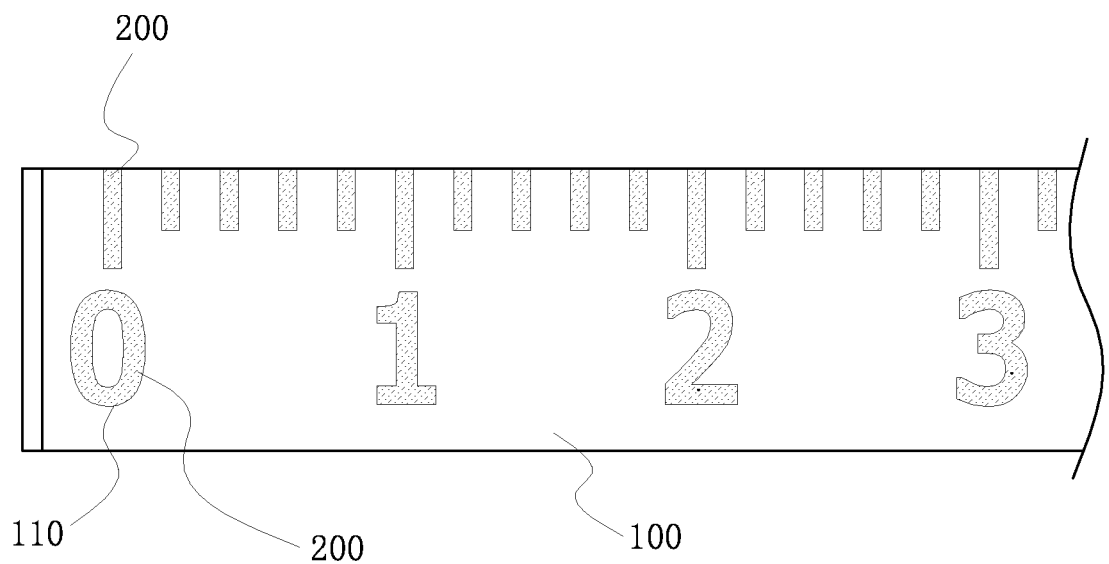
FIG. 3 is a top view of the ruler surface structure of the present invention.

Referring to FIGS. 1-3, the invention provides a ruler surface structure for clear marks display in a dim light, which mainly comprises a ruler surface 100 and plural brightening layers 200. The ruler surface 100 is a plane shape, which can be set separately or combined with other measuring tools. The present embodiment takes the tape measure 300 as an example, wherein the ruler surface 100 is normally coiled and received in the tape measure 300, and the ruler surface 100 is stretched when it is used.

Plural marks 110 formed by characters or lines are arranged on the ruler surface 100, wherein the plural marks 110 are usually marked as numbers or scales for measurement. In order to highlight the identification rate of the plural marks 110, each of the plural brightening layers 200 is laid on each of the plural marks 110. The plural brightening layers 200 cause the plural marks 110 and the other regions of the ruler surface 100 having different light sensitivities, including the functions of light reflection or luminescence, so that the plural marks 110 can be clearly displayed in the dim light, thereby achieving the technical features of the present invention.

In order to enhance the identification effect of the plural marks 110, the contour of each of the plural brightening layers 200 is completely consistent with or coincident with the peripheral shape of each of the plural marks 110, so that the contour of each of the plural marks 110 can be clearly displayed without blurring.

According to the foregoing structure, the production of the plural brightening layers 200 can be made from any kind of light reflecting material, such as the light reflecting materials on vehicle fault warning boards or life jackets, making use of the enhanced light reflecting effect of the plural brightening layers 200 to highlight the display of the plural marks 110 in the dim light, thereby providing a clear display of the plural marks 110.

Alternatively, the plural brightening layers 200 can be made from any kind of luminescent material, such as the fluorescent powder, making use of the luminescent effect of the plural brightening layers 200 to form the display of the plural marks 110 more clear, thereby providing a clearer display of the plural marks 110.

Figure 4:
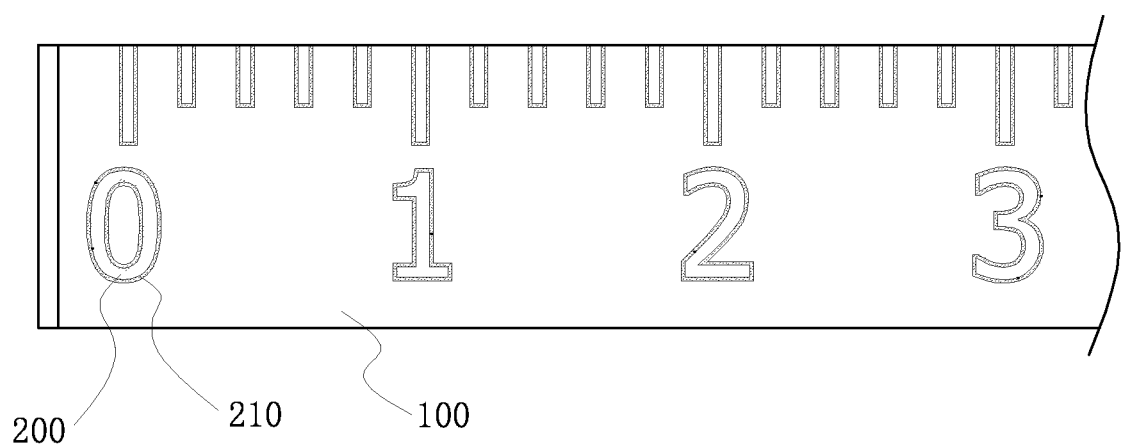
FIG. 4 is a top view of the ruler surface structure of the present invention for adding a contour layer to each of the plural brightening layers.

Referring to FIG. 4, the structural design of the invention has great flexibility, wherein a contour layer 210 can be set at an outline margin of each of the plural brightening layers 200, so that the light reflective or luminescent ability of the contour layer 210 is different from that of each of the plural brightening layers 200, resulting in different light sensitivities on the contour layer 210 and each of the plural brightening layers 200. Therefore, the periphery of each of the plural marks 110 covered by the contour layer 210 is highlighted, making it clearer to identify the plural marks 110.

Figure 5:
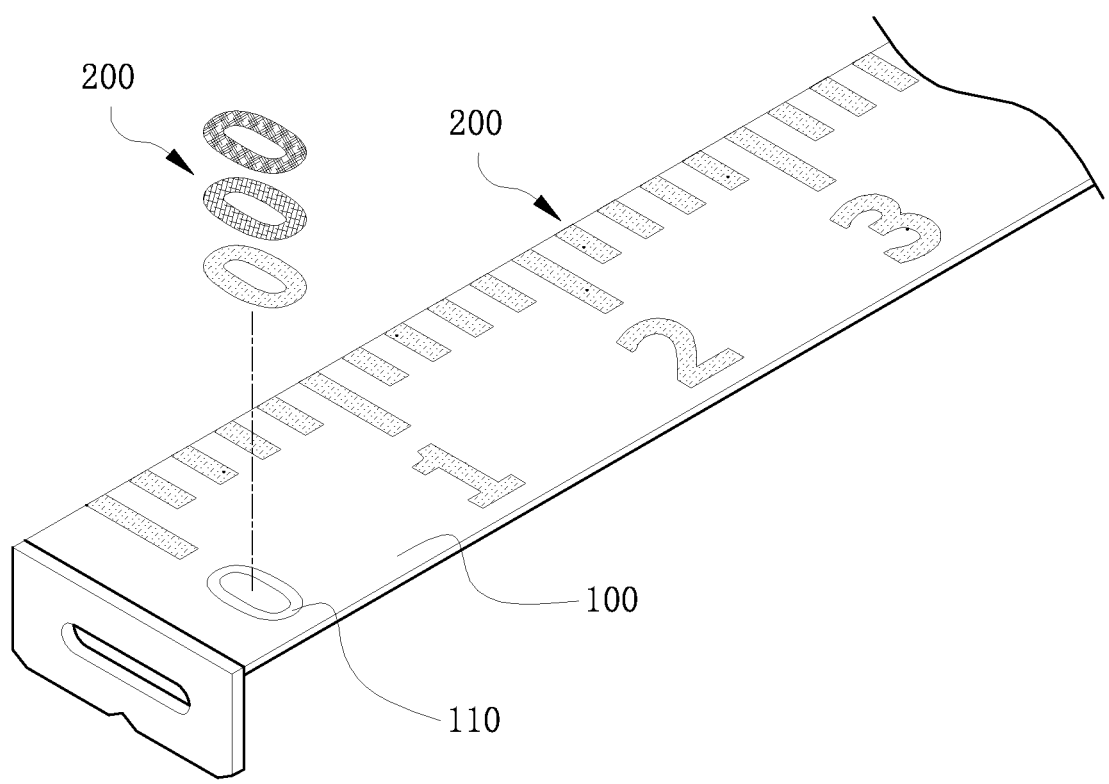
FIG. 5 is a perspective view of the ruler surface structure of the present invention for using a set of multiple brightening layers of each of the plural brightening layers arranged in an overlapping configuration.

Referring to FIG. 5, the aforesaid each of the plural brightening layers 200 of the invention can further be configured as a set of multiple brightening layers 200 arranged in an overlapping configuration, wherein each of the multiple brightening layers 200 can be adjusted to a specific degree of light reflection or luminescence, so that the multiple brightening layers 200 have different light sensitivities respectively. After light irradiation, the set of multiple brightening layers 200 causes the each of the plural marks 110 to form the display effect with a scintillation or a stereoscopic sense.

Figure 6:
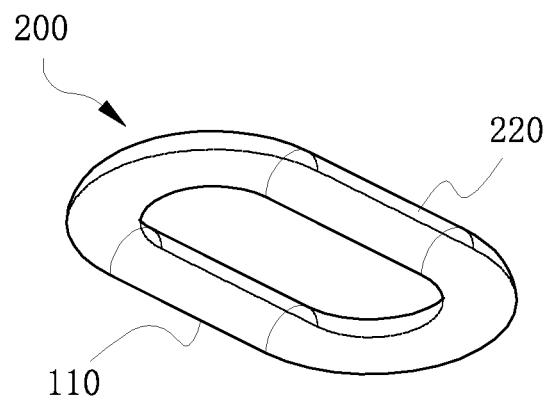
FIG. 6 is a schematic view of each of the plural brightening layers with a lens form.

Referring to FIG. 6, the aforesaid each of the plural brightening layers 200 of the invention can be designed with a lens shaped optical element, such as a convex lens 220, which can magnify the content of the each of the plural marks 110, so as to achieve a clearer display effect.

Figure 7:
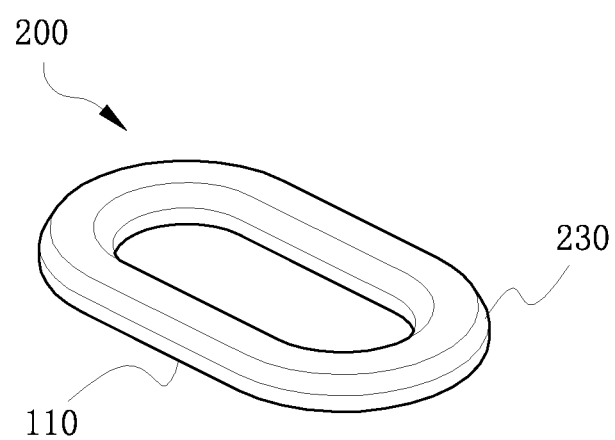
FIG. 7 is a schematic view of each of the plural brightening layers with a guide angle.

Referring to FIG. 7, the invention can also design a guide angle around the each of the plural brightening layers 200, which can be used to enhance the periphery of the each of the plural marks 110, thereby achieving a clearer display effect.

Obviously, the aforesaid technical features and the effects achieved of the invention are not limited to the application on all of the plural marks 110. In fact, they can be applied to at least one brightening layer 200 corresponding to at least one of the plural marks 110.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A ruler surface structure for clear marks display in a dim light, mainly comprising:
    a ruler surface upon which characters or lines are set as plural marks, and
    at least one brightening layer;
    wherein each of the at least one brightening layer is laid on the ruler surface covering each of at least one of the plural marks causing different light sensitivities on the at least one of the plural marks and the other regions of the ruler surface to clearly display the at least one of the plural marks,
    wherein the each of the at least one brightening layer is a set of multiple brightening layers arranged in an overlapping configuration, and the multiple brightening layers have different light sensitivities respectively, causing the each of the at least one of the plural marks to form the display effect with a scintillation or a stereoscopic sense.

2. The ruler surface structure as claimed in claim 1, wherein a contour of the each of the at least one brightening layer is consistent with or coincident with a peripheral shape of the each of the at least one of the plural marks, thereby enhancing the identification effect on the at least one of the plural marks.

3. The ruler surface structure as claimed in claim 2, wherein the contour layer is set around an outline margin of the each of the at least one brightening layer, the contour layer and the each of the at least one brightening layer have different light sensitivities, thereby enhancing the identification effect on the at least one of the plural marks.

4. The ruler surface structure as claimed in claim 1, wherein the each of the at least one brightening layer is made from a light reflecting material, using the light reflecting effect on the each of the at least one brightening layer to enhance the display of the at least one of the plural marks.

5. The ruler surface structure as claimed in claim 1, wherein the each of the at least one brightening layer is made from a luminescent material, using the luminescent effect on the each of the at least one brightening layer to enhance the display of the at least one of the plural marks.

6. The ruler surface structure as claimed in claim 1, wherein the plural marks are numbers or scales.

7. A ruler surface structure for clear marks display in a dim light, mainly comprising:
    a ruler surface upon which characters or lines are set as plural marks, and
    at least one brightening layer;
    wherein each of the at least one brightening layer is laid on the ruler surface covering each of at least one of the plural marks causing different light sensitivities on the at least one of the plural marks and the other regions of the ruler surface to clearly display the at least one of the plural marks,
    wherein the each of the at least one brightening layer is a lens shaped optical element to enhance the display effect on the at least one of the plural marks.

8. The ruler surface structure as claimed in claim 7, wherein a contour of the each of the at least one brightening layer is consistent with or coincident with a peripheral shape of the each of the at least one of the plural marks, thereby enhancing the identification effect on the at least one of the plural marks.

9. The ruler surface structure as claimed in claim 8, wherein the contour layer is set around an outline margin of the each of the at least one brightening layer, the contour layer and the each of the at least one brightening layer have different light sensitivities, thereby enhancing the identification effect on the at least one of the plural marks.

10. The ruler surface structure as claimed in claim 7, wherein the each of the at least one brightening layer is made from a light reflecting material, using the light reflecting effect on the each of the at least one brightening layer to enhance the display of the at least one of the plural marks.

11. The ruler surface structure as claimed in claim 7, wherein the each of the at least one brightening layer is made from a luminescent material, using the luminescent effect on the each of the at least one brightening layer to enhance the display of the at least one of the plural marks.

12. The ruler surface structure as claimed in claim 7, wherein the plural marks are numbers or scales.

13. A ruler surface structure for clear marks display in a dim light, mainly comprising:
- a ruler surface upon which characters or lines are set as plural marks, and
- at least one brightening layer;
- wherein each of the at least one brightening layer is laid on the ruler surface covering each of at least one of the plural marks causing different light sensitivities on the at least one of the plural marks and the other regions of the ruler surface to clearly display the at least one of the plural marks,
- wherein the each of the at least one brightening layer has a corresponding guide angle therearound to enhance the identification effect on the periphery of the at least one of the plural marks.

14. The ruler surface structure as claimed in claim 13, wherein a contour of the each of the at least one brightening layer is consistent with or coincident with a peripheral shape of the each of the at least one of the plural marks, thereby enhancing the identification effect on the at least one of the plural marks.

15. The ruler surface structure as claimed in claim 14, wherein the contour layer is set around an outline margin of the each of the at least one brightening layer, the contour layer and the each of the at least one brightening layer have different light sensitivities, thereby enhancing the identification effect on the at least one of the plural marks.

16. The ruler surface structure as claimed in claim 13, wherein the each of the at least one brightening layer is made from a light reflecting material, using the light reflecting effect on the each of the at least one brightening layer to enhance the display of the at least one of the plural marks.

17. The ruler surface structure as claimed in claim 13, wherein the each of the at least one brightening layer is made from a luminescent material, using the luminescent effect on the each of the at least one brightening layer to enhance the display of the at least one of the plural marks.

18. The ruler surface structure as claimed in claim 13, wherein the plural marks are numbers or scales.

* * * * *